US012584990B2

(12) United States Patent (10) Patent No.: US 12,584,990 B2
Morishima et al. (45) Date of Patent: Mar. 24, 2026

(54) VEHICLE CONTROL DEVICE

(71) Applicant: HITACHI ASTEMO, LTD.,
Hitachinaka (JP)

(72) Inventors: Kenta Morishima, Tokyo (JP); Tetsuya Yamada, Tokyo (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 350 days.

(21) Appl. No.: 18/555,563

(22) PCT Filed: Feb. 28, 2022

(86) PCT No.: PCT/JP2022/008424
§ 371 (c)(1),
(2) Date: Oct. 16, 2023

(87) PCT Pub. No.: WO2022/259644
PCT Pub. Date: Dec. 15, 2022

(65) Prior Publication Data
US 2024/0201315 A1 Jun. 20, 2024

(30) Foreign Application Priority Data

Jun. 10, 2021 (JP) ................................. 2021-097374

(51) Int. Cl.
*H04W 4/02* (2018.01)
*G01S 5/02* (2010.01)
(Continued)

(52) U.S. Cl.
CPC ................ *G01S 5/04* (2013.01); *G01S 13/46* (2013.01); *G08G 1/09* (2013.01); *G08G 1/16* (2013.01); *G01S 2013/468* (2013.01)

(58) Field of Classification Search
CPC ...... G01S 5/04; G01S 13/46; G01S 2013/468; G08G 1/16; G08G 1/09; B60R 99/00
(Continued)

(56) References Cited

U.S. PATENT DOCUMENTS

2007/0155404 A1* 7/2007 Yamane ............. G08G 1/09685
455/456.1
2014/0142837 A1* 5/2014 Takaki ................... G08G 1/166
701/301
(Continued)

FOREIGN PATENT DOCUMENTS

CN 109795479 A 5/2019
EP 3 789 985 A1 3/2021
(Continued)

OTHER PUBLICATIONS

IP.com search History (Year: 2025).*
(Continued)

*Primary Examiner* — Moustapha Diaby
(74) *Attorney, Agent, or Firm* — Foley & Lardner LLP

(57) ABSTRACT

An object of the present invention is to obtain a vehicle control device capable of guiding a host vehicle to a narrow area by low-speed automatic driving by quick and precise positioning of the host vehicle, and guiding the host vehicle to a stop position of which details are unknown by designating each stop frame by beacons. A vehicle control device 101 according to the present invention includes a wireless reception unit 121 that receives radio waves through a plurality of antennas 102 mounted on a host vehicle 100, the radio waves being transmitted from a plurality of beacons 201, a position information acquisition unit 122 that obtains position information of the beacons using orientation information of the radio waves received by the wireless reception unit, and a guidance area estimation unit 124 that sets a diagonal line 301 of a rectangular area 302 from the position
(Continued)

START ~ S501
S502 FIRST BEACON IS DETECTED? — No
Yes
S503 SECOND BEACON IS DETECTED? — No
Yes
ACQUIRE COORDINATES OF EACH BEACON TO OBTAIN RECTANGULAR AREA ~ S504
OBTAIN ENTRANCE PERMITTED SIDE FROM ID OF BEACON ~ S505
PERFORM COURSE ESTIMATION ~ S506
S507 RECTANGULAR AREA CAN BE ENTERED OR LEFT WITHOUT CONTACT WITH ENTRANCE PROHIBITED SIDE? — No
Yes
MOVE IN ACCORDANCE WITH INSTRUCTION FROM CONTROL UNIT ~ S508
END ~ S510 information and estimates a guidance area 312 from the diagonal line.

5 Claims, 12 Drawing Sheets

(51) Int. Cl.
*G01S 5/04* (2006.01)
*G01S 13/46* (2006.01)
*G08G 1/09* (2006.01)
*G08G 1/16* (2006.01)
*H04W 64/00* (2009.01)

(58) Field of Classification Search
USPC ....................................................... 455/456.1
See application file for complete search history.

(56) References Cited

U.S. PATENT DOCUMENTS

| | | | |
|---|---|---|---|
| 2016/0247210 A1* | 8/2016 | Yamashiro | G07B 15/02 |
| 2018/0130351 A1* | 5/2018 | Ha | B60R 1/22 |
| 2018/0253104 A1* | 9/2018 | Miyamoto | G05D 1/0272 |
| 2019/0113934 A1* | 4/2019 | Björkengren | G05D 1/0276 |
| 2020/0148196 A1* | 5/2020 | Lim | G08G 1/0125 |

FOREIGN PATENT DOCUMENTS

| | | | |
|---|---|---|---|
| JP | 10-269497 A | 10/1998 |
| JP | 2015-008816 A | 1/2015 |
| JP | 2015-088116 A | 5/2015 |
| JP | 2019-194801 A | 11/2019 |
| JP | 2020-080142 A | 5/2020 |
| WO | WO-2006/064544 A1 | 6/2006 |

OTHER PUBLICATIONS

Japanese Office Action issued in corresponding JP Application No. 2021-097374, dated Dec. 3, 2024 with English translation (8 pages).
International Search Report with English Translation and Written Opinion of International Patent Application No. PCT/JP2022/008424 dated Apr. 5, 2022 (11 pages).

* cited by examiner

VEHICLE CONTROL DEVICE

TECHNICAL FIELD

The present invention relates to a vehicle control device that performs, for example, low-speed automatic traveling control of an automobile.

BACKGROUND ART

Conventionally, in low-speed automatic traveling control of an automobile, positioning of a vehicle and avoidance of contact with surrounding obstacles are performed using an in-vehicle camera and a sonar. When the vehicle is guided to a narrow place by the low-speed automatic traveling control, the in-vehicle camera has a weak point in distance accuracy and a blind spot. Since the sonar has a narrow measurable range, in order to generate a precise map for low-speed automatic traveling, it is necessary to perform re-measurement by repeatedly approaching and separating from a target stop position a plurality of times. In addition, the sonar has a shape that is difficult to recognize such as a fence, and it has been difficult to cope with generation of a precise map.

PTL 1 has proposed a method of transmitting and guiding high-accuracy map information up to a stop area (frame) to an approaching automobile. However, there is an error in a host vehicle position arrangement on the map information, and passage in a case where there is no margin in a distance from the obstacle is not considered.

CITATION LIST

Patent Literature

PTL 1: JP 2020-80142 A

SUMMARY OF INVENTION

Technical Problem

For example, in an urban area or a private land, it is necessary to cause a vehicle to enter a narrow area due to a gate pillar or an obstacle and stop or pass the vehicle by low-speed automatic traveling control. A means for quickly and accurately recognizing an accessible area of a vehicle in such a situation has been required.

Solution to Problem

A vehicle control device of the present invention that solves the above problem includes: a wireless reception unit that receives radio waves through a plurality of wireless reception antennas mounted on a vehicle, the radio waves being transmitted from a plurality of wireless transmitters; a position information acquisition unit that obtains position information of the radio transmitters by using orientation information of the radio waves received by the radio reception unit; and a guidance area estimation unit that sets a diagonal line of a rectangular area from the position information and estimates a guidance area from the diagonal line.

Advantageous Effects of Invention

According to the present invention, quick and precise positioning of a host vehicle enables the host vehicle to be guided to a narrow area by low-speed automatic driving, and designation of each stop frame by beacons enables the host vehicle to be guided to a stop position of which details are unknown. Further features related to the present invention will become apparent from the description of the present specification and the accompanying drawings. Problems, configurations, and effects other than those described above will be clarified by the following description of embodiments.

BRIEF DESCRIPTION OF DRAWINGS

FIG. 1 is a diagram illustrating a configuration of a vehicle control device according to an example.

FIG. 2 is a block diagram illustrating a functional configuration example of the vehicle control device.

DESCRIPTION OF EMBODIMENTS

Figure 3:
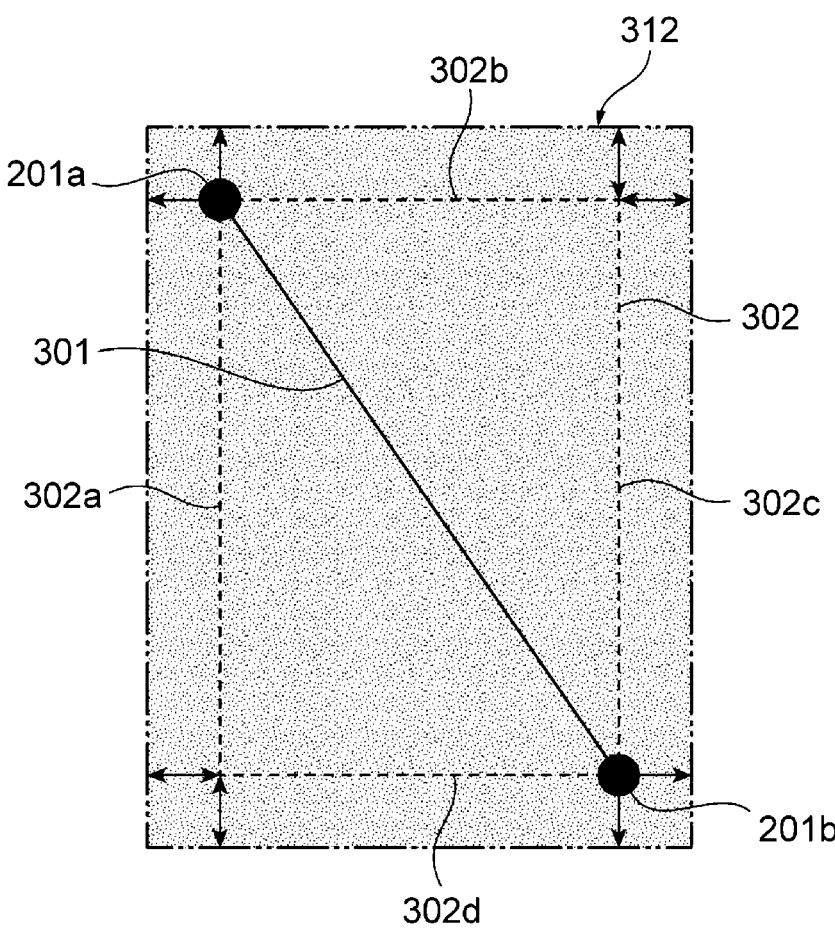
FIG. 3 is a diagram for describing a method for estimating a guidance area by a guidance area estimation unit.

A vehicle control device of the present embodiment, for example, performs control to automatically operate an automobile at a low speed and causes the vehicle to enter a narrow area such as an urban area or a private land and stop or pass the vehicle.

Figure 1:
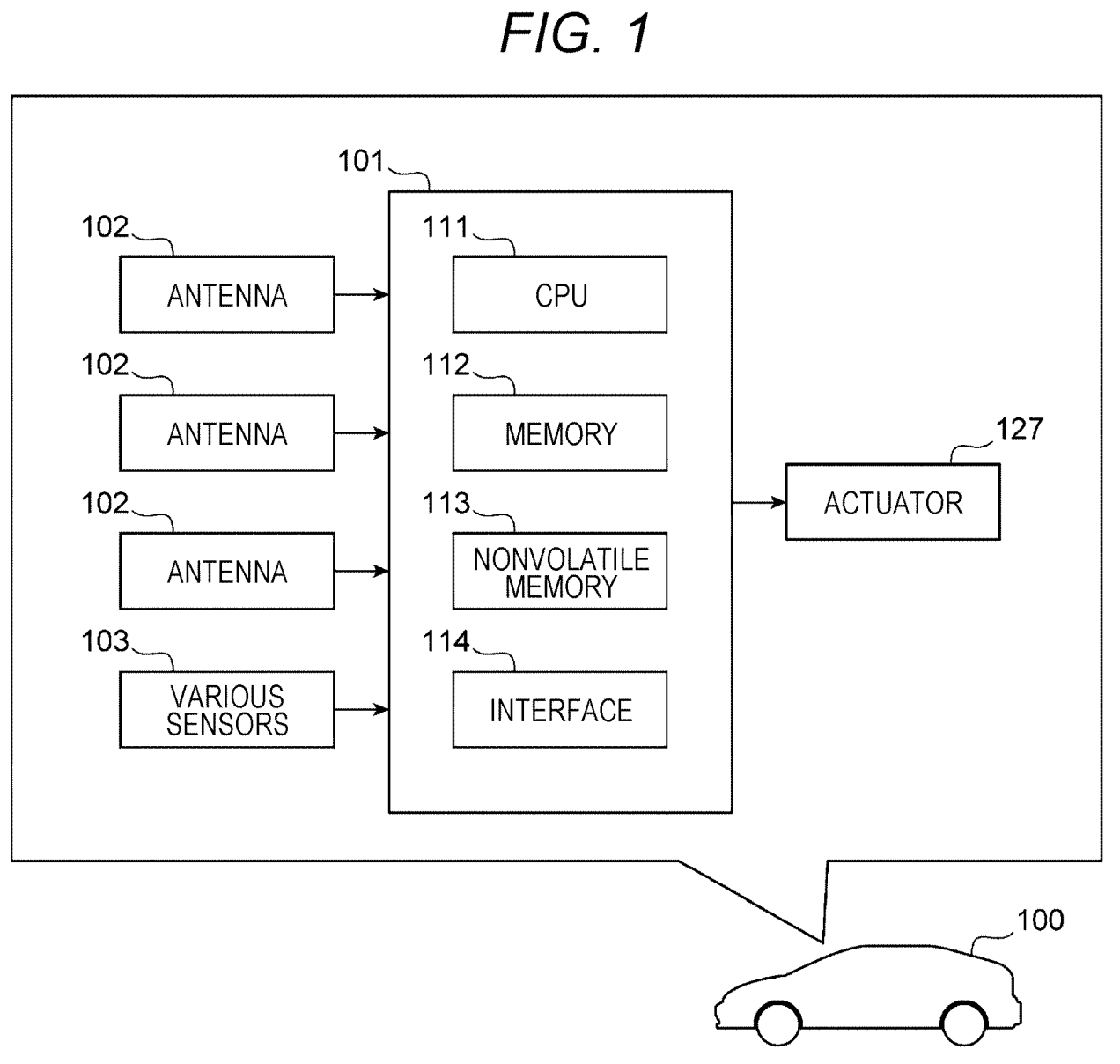

FIG. 1 is a diagram illustrating a configuration of a vehicle control device according to an example.

A vehicle control device 101 is mounted on a vehicle (host vehicle) 100. In the present example, the vehicle control device 101 is an electronic control unit (ECU). The ECU is an abbreviation of an electronic control unit, and is an electronic control circuit having a microcomputer as a component. The vehicle control device 101 includes a central processing unit (CPU) 111, a memory 112, a nonvolatile memory 113, an interface 114, and the like.

The CPU 111 includes at least one processor and/or circuit. The memory 112 includes, for example, a random access memory (RAM). The nonvolatile memory 113 includes, for example, a flash memory and a read only memory (ROM). The CPU 111 executes a program code (instruction) stored in the nonvolatile memory 113 by using the memory 112 as a work memory. As a result, the CPU 111 can execute processing described below.

The host vehicle 100 includes a plurality of antennas (wireless reception antennas) 102 that receive wireless signals from wireless transmitters, various sensors 103 for external recognition such as sonars and a camera, and an actuator 127 for performing low-speed automatic traveling.

For example, the plurality of antennas 102 are attached to a total of three places of a front portion, a rear portion, and an intermediate position between the front portion and the rear portion of a vehicle body of the host vehicle 100, the sonars are attached to both left and right sides of the front portion and the rear portion of the vehicle body, and the camera is attached so as to be able to image a front through a windshield. The actuator 127 includes a traveling actuator that adjusts a traveling speed of the host vehicle 100, a braking actuator that adjusts a braking force of a brake, and a steering actuator that operates a steering wheel, and is configured to control the traveling speed, the braking force, and the steering wheel in accordance with an instruction from the vehicle control device 101.

(Configuration of Vehicle Control Device)

Figure 2:
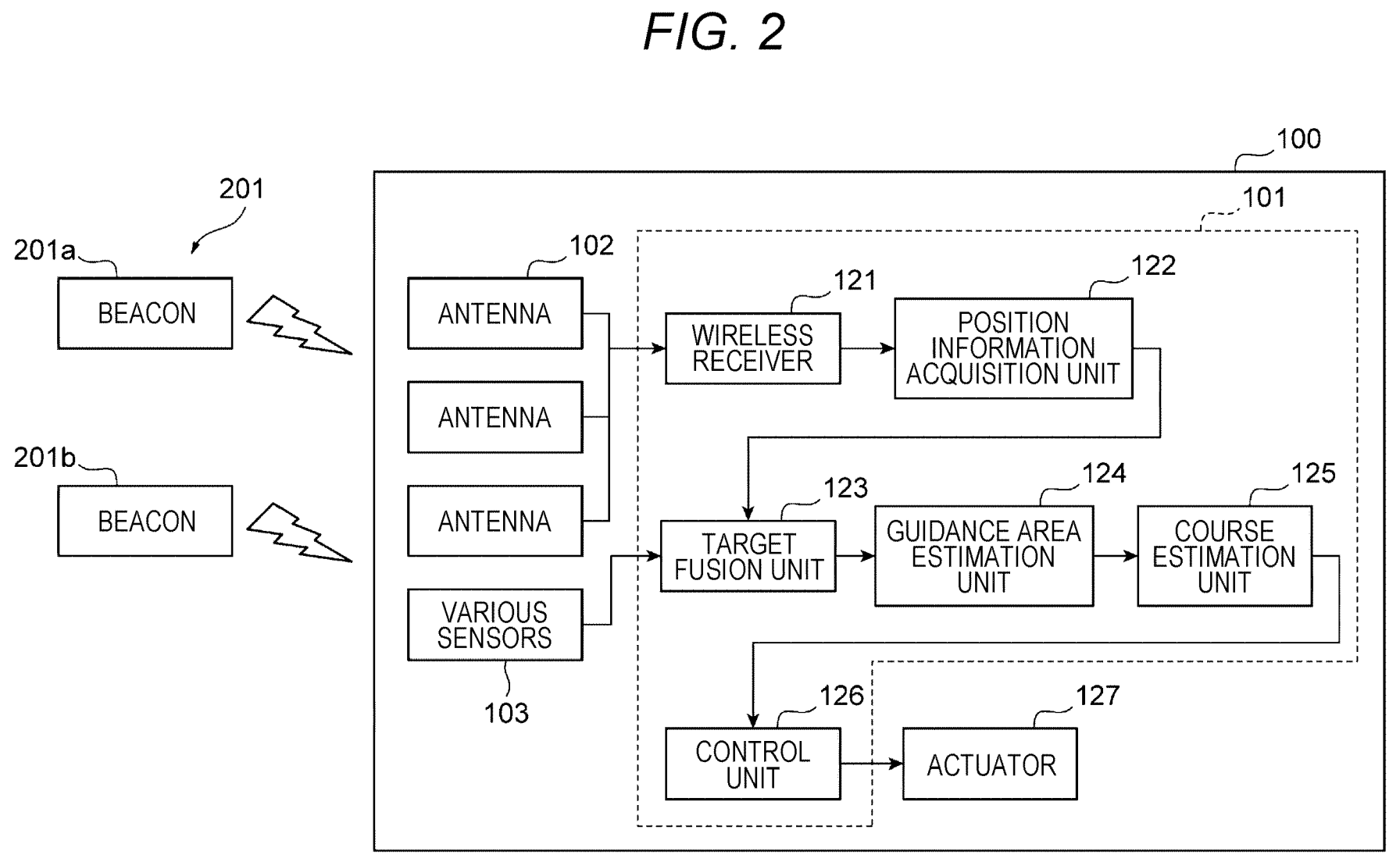

FIG. 2 is a block diagram illustrating a functional configuration example of the vehicle control device.

The vehicle control device 101 receives radio waves from beacons 201 by the plurality of antennas 102, creates high-accuracy map information, and performs control to cause the host vehicle 100 to automatically travel at a low speed on the basis of the high-accuracy map information. The beacons 201 are each a wireless transmitter that transmits a radio wave including identification information (ID information), such as a Bluetooth Low Energy (BLE) beacon. In the case of the BLE beacon, a Bluetooth Direction Finding function of the Bluetooth standard 5.1 may be used.

The vehicle control device 101 exerts various internal functions by the CPU 111 executing a software program stored in the nonvolatile memory 113. The vehicle control device 101 has, as its internal functions, a radio receiver 121, a position information acquisition unit 122, a target fusion unit 123, a guidance area estimation unit 124, a course estimation unit 125, and a control unit 126. The radio receiver 121 receives the radio waves including orientation information from the plurality of antennas 102.

The position information acquisition unit 122 obtains angle information from a phase difference between the antennas 102, and obtains information on a relative position (position information) of each of the beacons 201. The position information acquisition unit 122 can acquire coordinate position information of the beacons 201 by receiving the radio waves from the beacons 201 through the antennas 102. By receiving the radio wave in each of the antennas 102, the position information acquisition unit 122 can detect a direction of each of the beacons 201 with respect to each of the antennas 102.

Using a distance between the two antennas 102 and each of the directions from each of the antennas 102 toward one of the beacons 201, the position information acquisition unit 122 can obtain the distance from each of the antennas 102 to the beacon 201 and a narrow angle between the antennas 102 with the beacon 201 interposed therebetween by trigonometry. The beacons 201 are each installed on a fixed object such as a ground or a curbstone. At least two beacons 201 are disposed in pairs at diagonal positions of a preset rectangular area.

The target fusion unit 123 integrates the position information acquired by the position information acquisition unit 122 and environment information obtained from signals of the various sensors 103 to generate the high-accuracy map information.

The guidance area estimation unit 124 estimates a guidance area where the host vehicle 100 is guided on the basis of the ID information acquired from each of the plurality of beacons 201 and the coordinate position of each of the beacons 201. A method for estimating the guidance area will be described later. Note that, in the present embodiment, a configuration example in which the high-accuracy map information is generated by the target fusion unit 123 has been described. However, the target fusion unit 123 may be omitted, and the position information acquisition unit 122 may generate the high-accuracy map information using only the position information.

The course estimation unit 125 estimates a course of the host vehicle 100 in accordance with a constraint of the estimated guidance area. The control unit 126 obtains an actuator control amount for causing the host vehicle 100 to travel along the course estimated by the course estimation unit 125. The actuators drive, for example, an accelerator pedal, a brake pedal, and a steering wheel, and the actuator control amount includes a control amount of each of the actuators.

Figure 4:
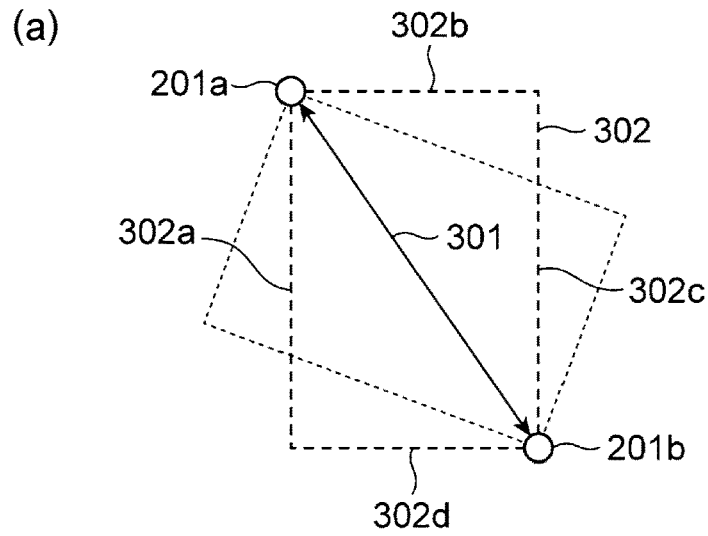
FIG. 4 is diagrams for describing the method for estimating the guidance area by the guidance area estimation unit.
Figure 4:
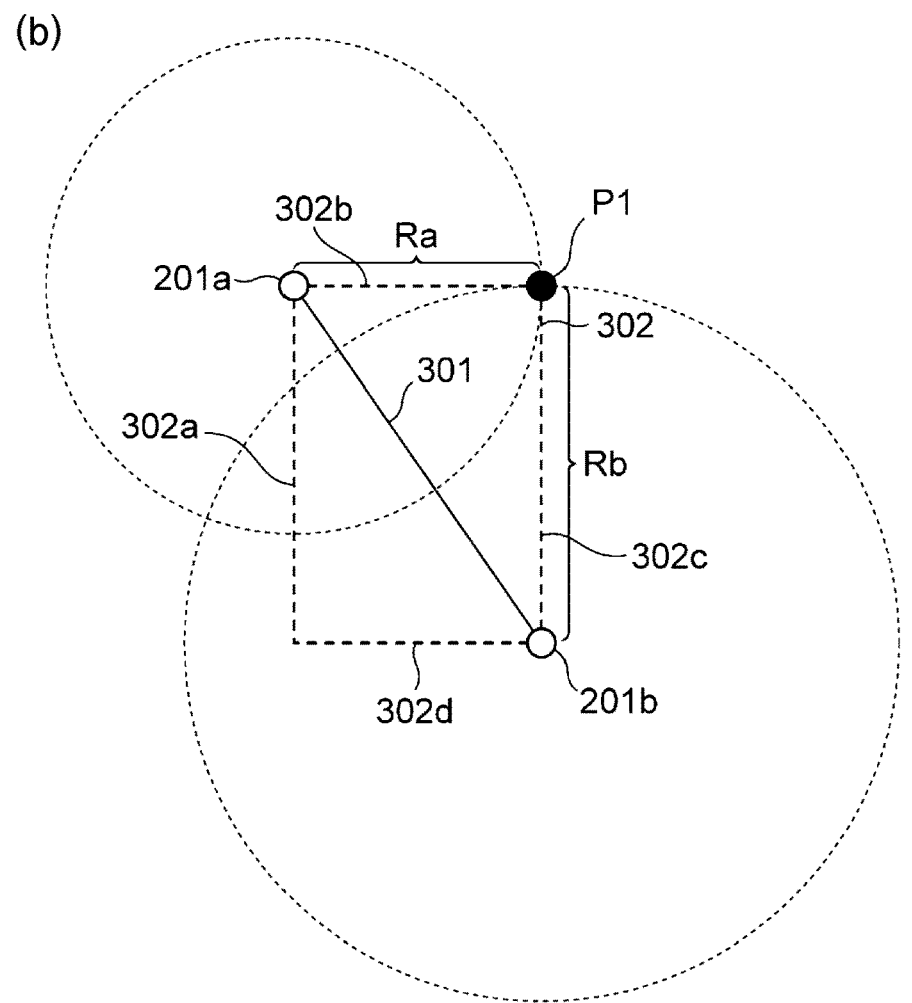

FIGS. 3 and 4 are diagrams for describing the method for estimating the guidance area by the guidance area estimation unit.

A guidance area 312 is a rectangular area larger than the host vehicle 100 and is a narrow area that the host vehicle 100 can enter at a low speed, can stop in, or can pass through. The guidance area 312 has, for example, a shape obtained by enlarging a rectangular area 302 in a similar manner, and the rectangular area 302 is set at a position going inward by a predetermined distance from each of front, back, left, and right sides. In the guidance area 312, a first beacon 201*a* and a second beacon 201*b* are installed at both ends of a diagonal line 301 of the rectangular area 302. Coordinates of the diagonal line 301 of the rectangular area 302 are obtained from coordinates of the first beacon 201*a* and the second beacon 201*b*, and the guidance area 312 can be obtained from the rectangular area 302.

If two first beacons 201*a* that output same ID signals from each other are disposed, two types of rectangular areas 302 are estimated as illustrated in FIG. 4(*a*) only by definition of the diagonal line. Therefore, in the present example, the first beacon 201*a* and the second beacon 201*b* that output different ID signals are disposed. For example, it is defined as a rectangle in which a right side of the diagonal line when the first beacon 201*a* is viewed from the second beacon 201*b* is a short side, and an orientation of the rectangle can be uniquely determined.

The guidance area estimation unit 124 sets the diagonal line 301 of the rectangular area 302 on the basis of the ID information included in the signals output from the first beacon 201*a* and the second beacon 201*b*, and sets the guidance area 312 from the diagonal line 301. The ID information of the first beacon 201*a* also includes, as information for setting the rectangular area 302, information in which a right side of the diagonal line 301 among two sides sandwiching the diagonal line 301 from the first beacon 201*a* is a long side 302*a* of a radius Rb and a left side is a short side 302*b* of a radius Ra. Similarly, the ID information of the second beacon 201*b* also includes information in which a right side with respect to the diagonal line 301 among two sides sandwiching the diagonal line 301 from the second beacon 201*b* is a long side 302*c* and a left side with respect to the diagonal line is a short side 302*d*. If information on lengths of the long sides 302*a*, 302*c* and the short sides 302*b*, 302*d* can be acquired, a position of another corner portion P1 can be obtained, and an orientation of the rectangular area 302 can be uniquely determined. The ID information of the beacons 201 can be input to the beacons 201*a*, 201*b* by a terminal device such as a smartphone.

Figure 5:
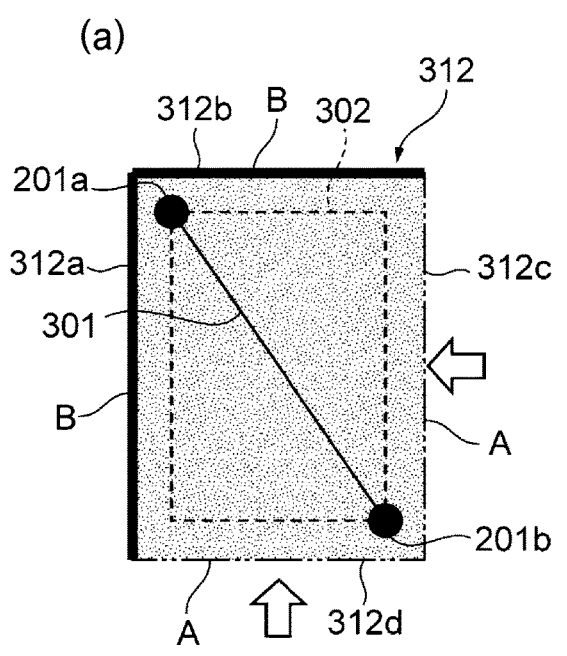
FIG. 5 is diagrams each illustrating an example in which an entry permitted side (entry permitted sides) and an entry prohibited side (entry prohibited sides) are set in the guidance area.
Figure 5:
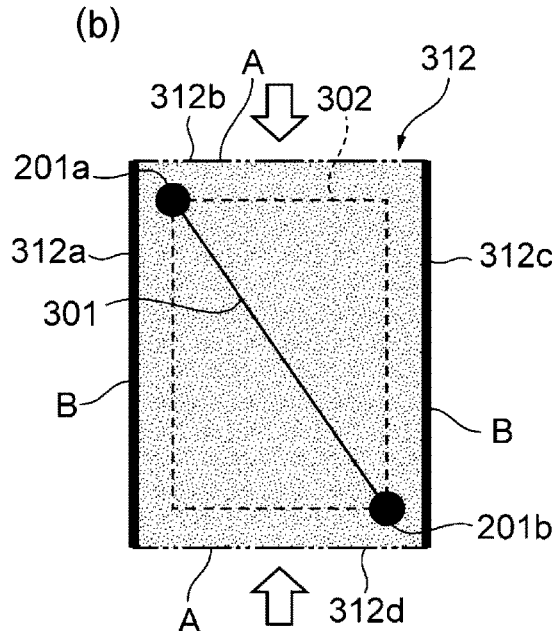
Figure 5:
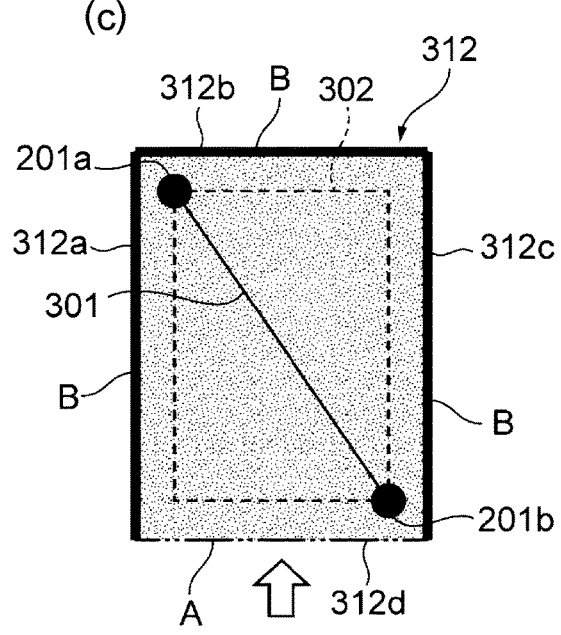
Figure 5:
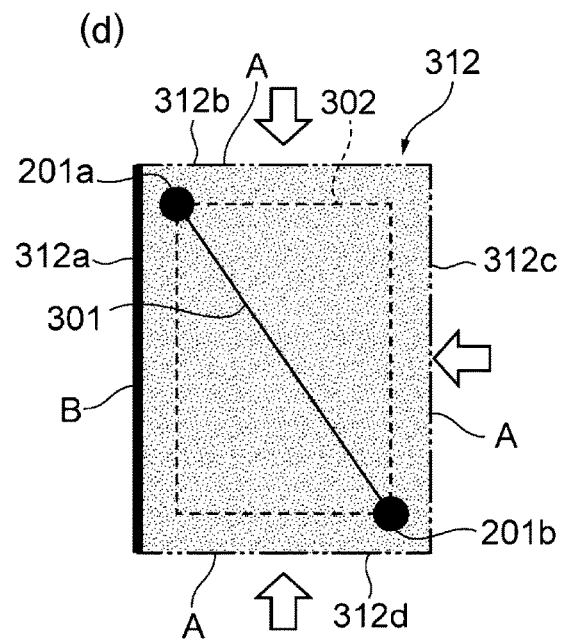

FIG. 5 is diagrams each illustrating an example in which an entry permitted side (entry permitted sides) and an entry prohibited side (entry prohibited sides) are set in the guidance area.

For example, in a case where the guidance area is a virtual stop frame, the ID information of the first beacon 201*a* and the second beacon 201*b* can include information of an entry permitted side A from which the host vehicle 100 can enter the guidance area 312 and information of an entry prohibited side B from which the host vehicle 100 cannot enter the guidance area 312. The radio wave transmitted from each of the beacons 201 includes, for four sides defining the guidance area 312, ID information defining the entry permitted side A from which the host vehicle 100 can enter the guidance area 312 and the entry prohibited side B from which the host vehicle 100 cannot enter the guidance area 312.

In an example illustrated in FIG. 5(*a*), a long side 312*c* and a short side 312*d* are set as the entry permitted sides A, and a long side 312*a* and a short side 312*b* are set as the entry prohibited sides B. In an example illustrated in FIG. 5(*b*), the short side 312*b* and the short side 312*d* are set as the entry permitted sides A, in an example illustrated in FIG. 5(*c*), only the short side 312*d* is set as the entry permitted side A, and in an example illustrated in FIG. 5(*d*), the short side 312*b*, the long side 312*c*, and the short side 312*d* are set as the entry permitted sides A. Although not illustrated, all sides of the long sides 312*a*, 312*c* and the short sides 312*b*, 312*d* may be set as the entry permitted sides A.

The information on the entry permitted side A and the entry prohibited side B is input to the course estimation unit 125 as a constraint condition of the estimated guidance area, and is used by the course estimation unit 125 to estimate a course. In the course estimation unit 125, the above information is used to estimate a course in which the host vehicle 100 enters the guidance area 312 by passing only the entry permitted side A without crossing the entry prohibited side B.

Figure 6:
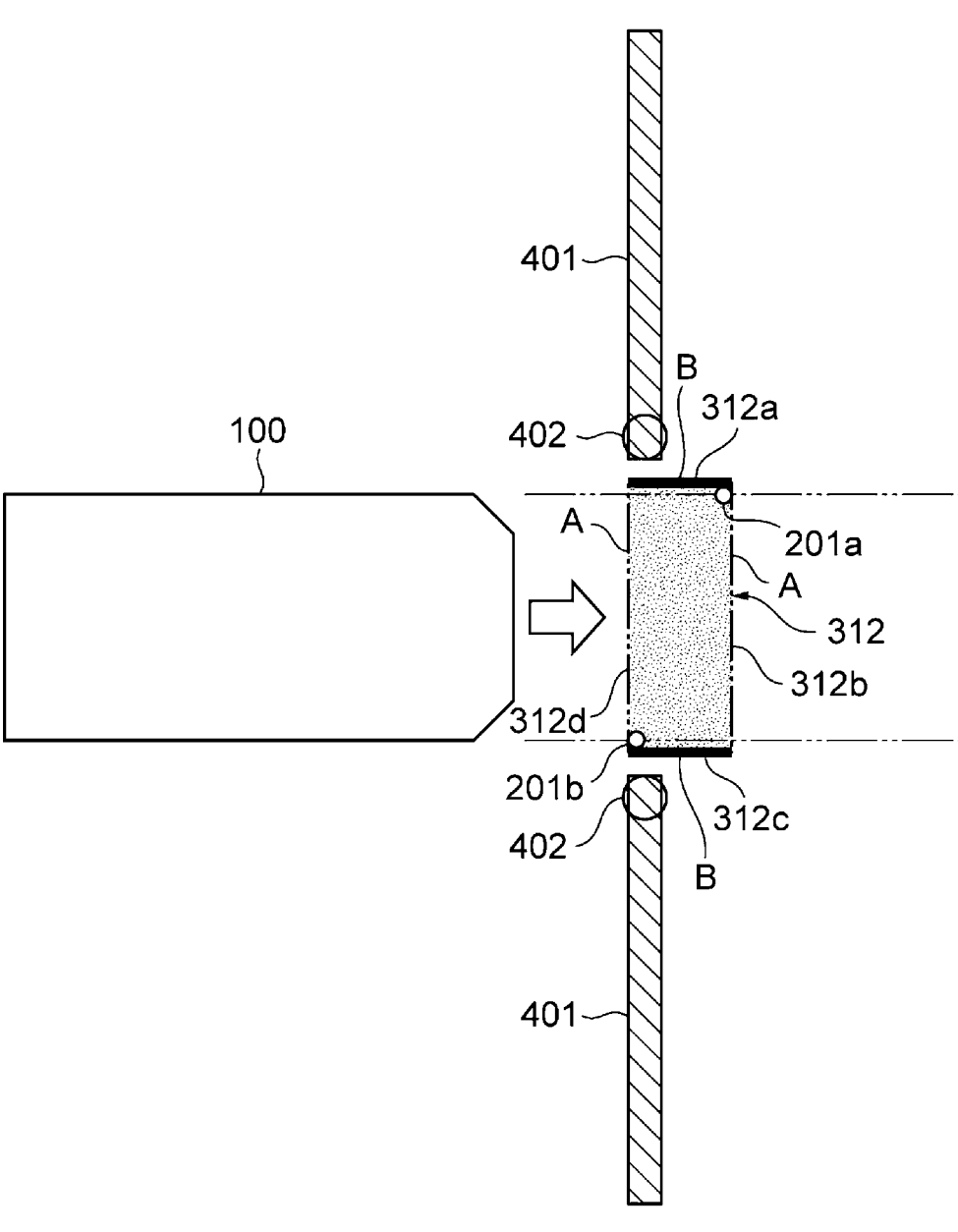
FIG. 6 is a diagram illustrating one example of the guidance area.

FIG. 6 is a diagram illustrating one example of the guidance area, and illustrates an example in which the host vehicle passes through an area sandwiched by gate pillars for which a precise host vehicle position needs to be acquired.

A pair of gate pillars 402 provided on a fence 401 is slightly larger than a lateral width of the host vehicle 100, and has a narrow interval such that the host vehicle 100 cannot pass through the gate pillars unless left and right door mirrors of the host vehicle 100 are folded, for example. The pair of beacons 201*a*, 201*b* is fixed to a road surface, and the guidance area 312 for the host vehicle 100 to pass between the pair of gate pillars 402 is set. The signals of the beacons 201*a*, 201*b* include information of coordinates indicating positions of the beacons 201*a*, 201*b*, and the ID information in which the sides 312*d*, 312*b* along a passage width direction between the pair of gate pillars 402 are set as the entry permitted sides A, and the sides 312*a*, 312*c* along a traveling direction are set as the entry prohibited sides B.

The vehicle control device 101 estimates the guidance area 312 on the basis of the signals of the beacons 201*a*, 201*b*, and acquires a precise host vehicle position with respect to the guidance area 312. Then, a course is estimated in which the host vehicle 100 enters the guidance area 312 through the entry permitted sides A without contacting the entry prohibited sides B, and passes between the gate pillars 402. Then, control is performed to cause the host vehicle 100 to automatically travel at a low speed along the estimated course.

Figure 7:
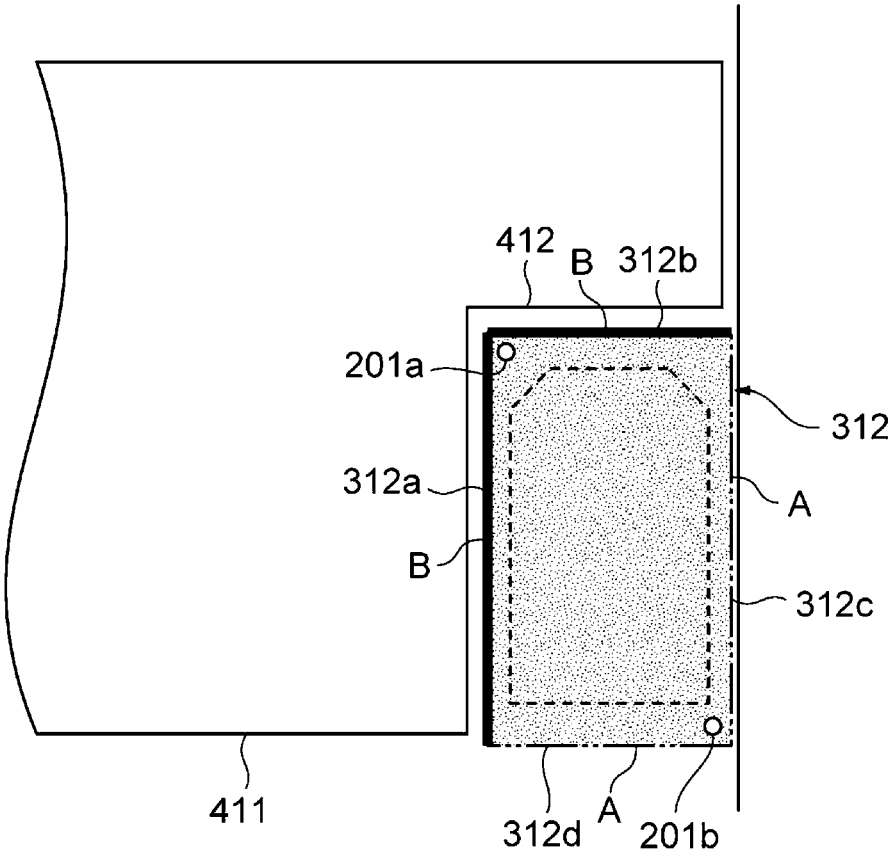
FIG. 7 is a diagram illustrating one example of the guidance area.
Figure 7:
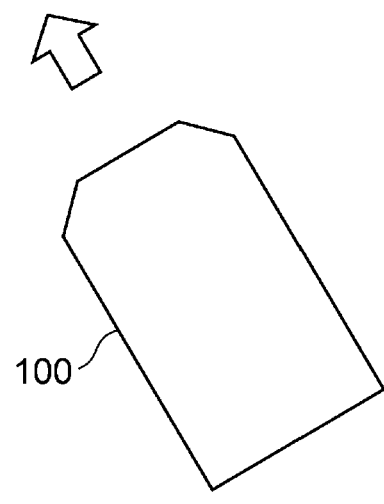

FIG. 7 is a diagram illustrating one example of the guidance area, and illustrates an example in which the host vehicle is stopped in an empty space.

An empty space 412 adjacent to a building 411 has such a size that the vehicle cannot be stopped unless the left and right door mirrors of the host vehicle 100 are folded. On ground of the empty space 412, the pair of beacons 201*a*, 201*b* is fixed, and the guidance area 312 for the host vehicle 100 to enter and stop in the empty space 412 is set. The signals of the beacons 201*a*, 201*b* include the information of the coordinates indicating the positions of the beacons 201*a*, 201*b*, and the ID information in which the outer sides 312*c*, 312*d* along a length direction and a width direction of the empty space 412 are set as the entry permitted sides A, and the sides 312*a*, 312*b* on a building side are set as the entry prohibited sides B.

The vehicle control device 101 estimates the guidance area 312 on the basis of the signals of the beacons 201*a*, 201*b*, and acquires a precise host vehicle position with respect to the guidance area 312. A course is estimated in which the host vehicle 100 enters the guidance area 312 by passing through the entry permitted sides A without contacting the entry prohibited sides B and stops in the guidance area 312. Then, control is performed to cause the host vehicle 100 to automatically travel at a low speed along the estimated course. Therefore, even in a narrow space such as the empty space 412, it is possible to accurately recognize a relative position with respect to the host vehicle 100 and automatically stop the host vehicle 100.

Figure 8:
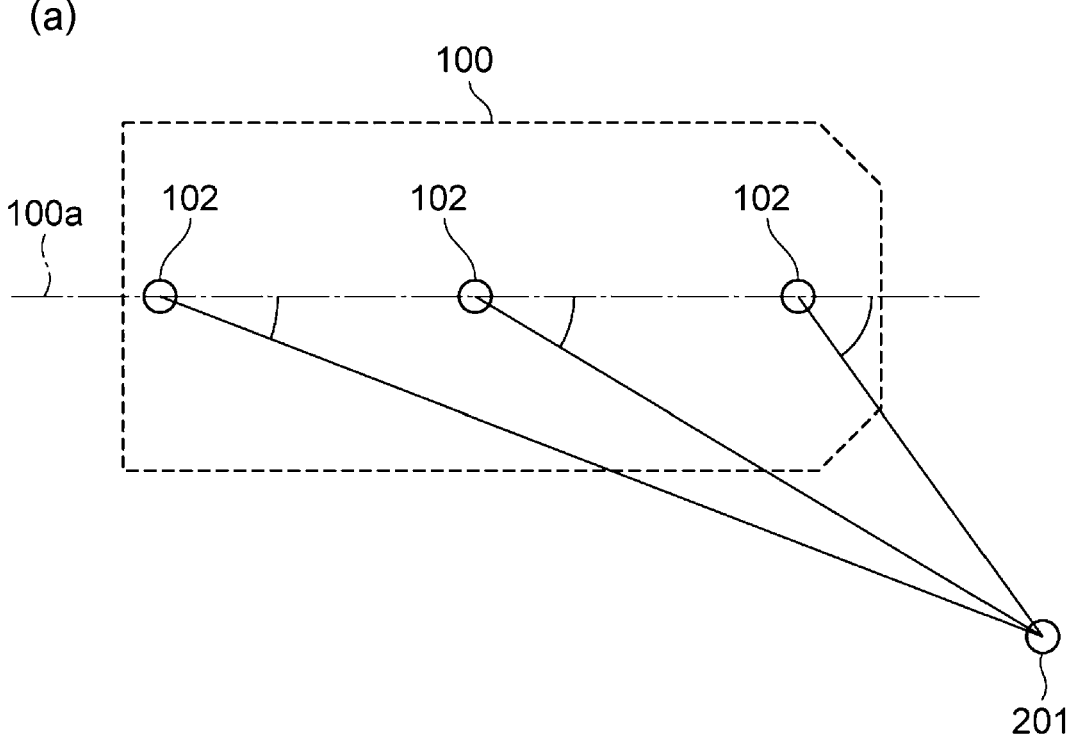
FIG. 8 is diagrams illustrating a principle of a method for obtaining a position of a wireless transmitter from a plurality of antennas.
Figure 8:
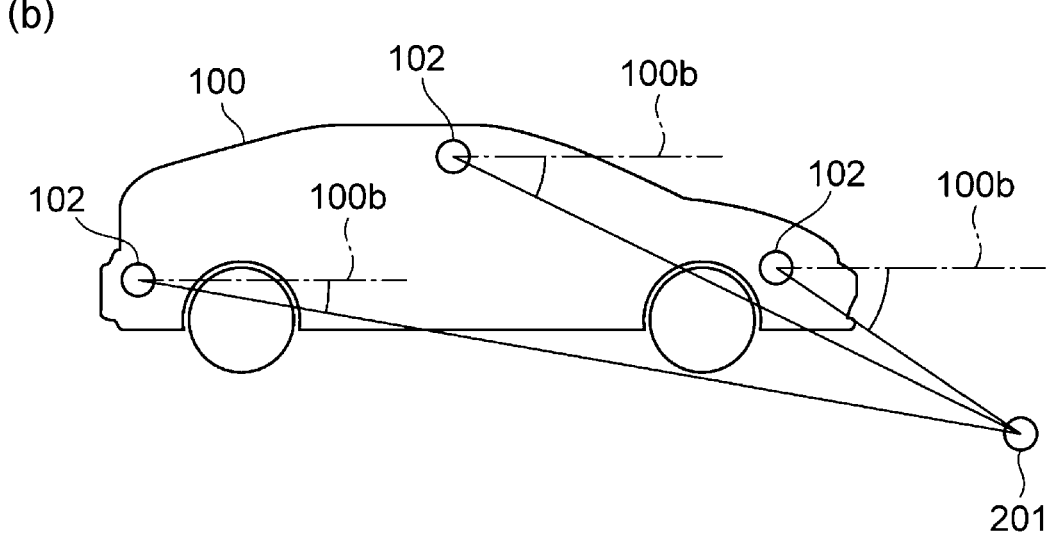

FIG. 8 is a diagram illustrating a principle of a method for obtaining a position of a wireless transmitter from a plurality of antennas.

The plurality of antennas 102 are installed in the host vehicle 100. For example, as illustrated in FIG. 8(*a*), the plurality of antennas 102 are separately disposed in the front portion, the rear portion, and the intermediate position of vehicle 100. As illustrated in FIG. 8(*b*), the antennas 102 are provided at different positions in height.

The radio wave from the beacon 201 is received by the antennas 102, an angle with respect to a vehicle reference axis is obtained from a phase difference in the radio wave for each of the antennas 102, and the relative position of the beacon 201 can be obtained with a high accuracy by using trigonometry. That is, since a separation distance between the respective antennas 102 in the host vehicle 100 is known, for example, by detecting, by each of the antennas 102, a direction of the beacon 201 with respect to a vehicle center line 100*a* and a vehicle horizontal line 100*b*, which are vehicle reference axes, the accurate relative position of the beacon 201 can be calculated.

Figure 9:
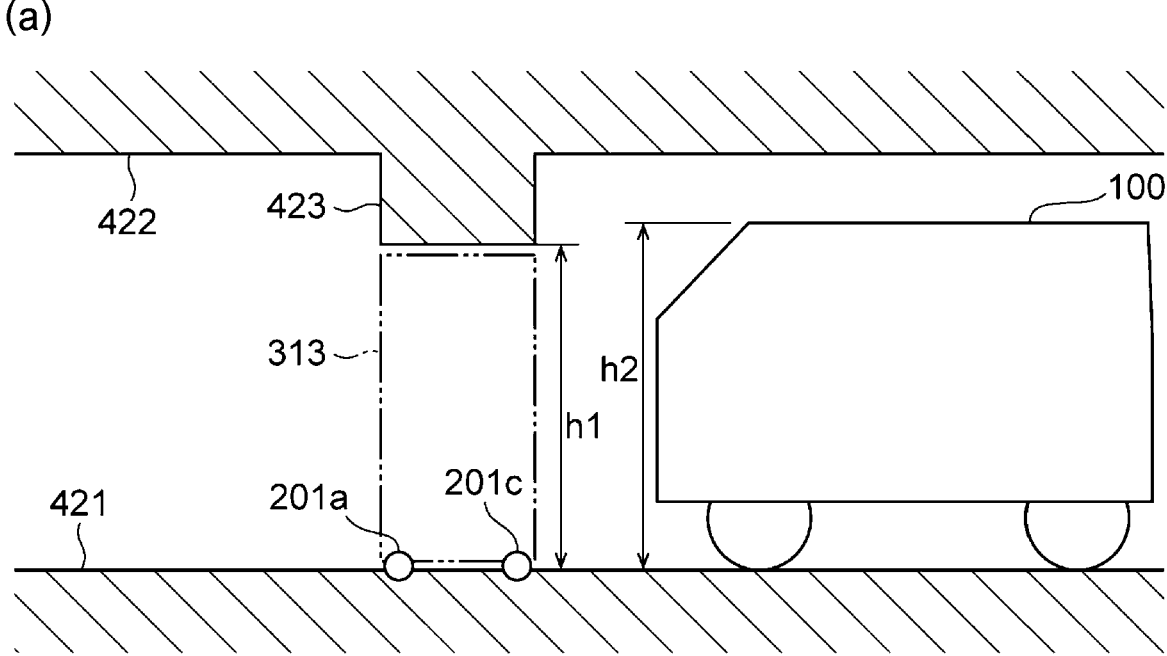
FIG. 9 is diagrams each illustrating a modification.
Figure 9:
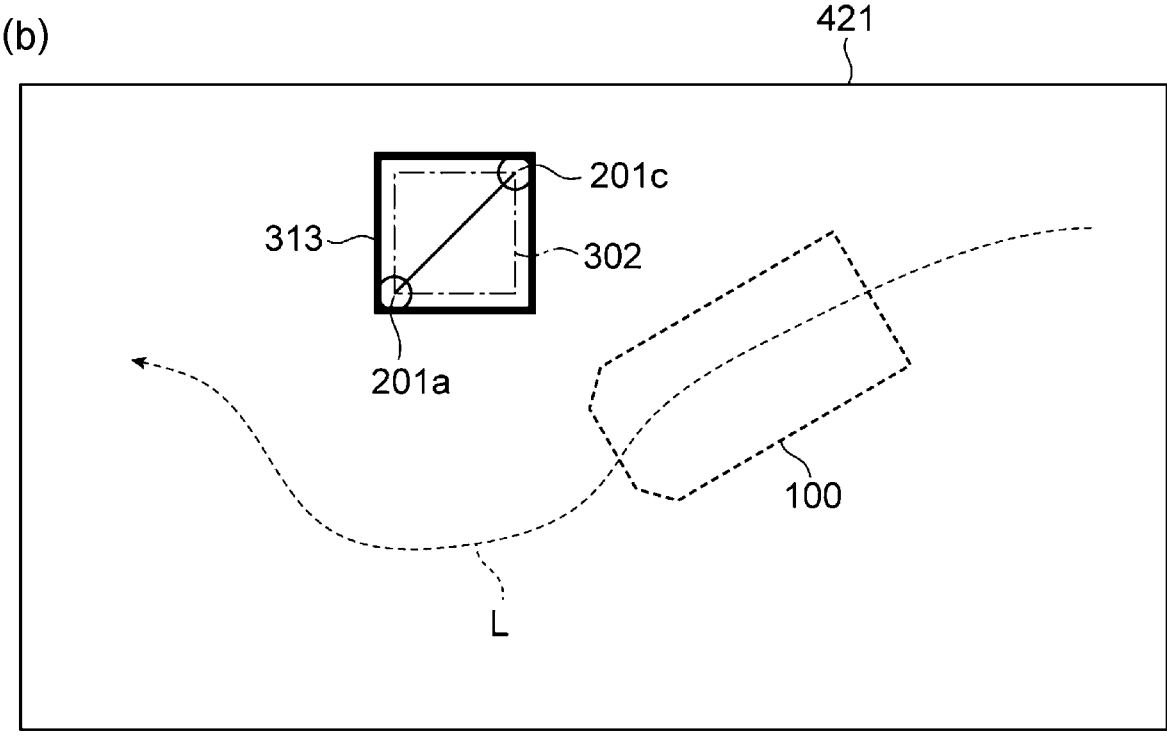

FIG. 9 is diagrams illustrating a modification.

In the above-described example, the case where the planar guidance area is set by the two beacons 201*a*, 201*b* has been described. In this modification, a method for setting a three-dimensional non-guidance area using a beacon 201*c* having information of an area height in the ID information will be described.

For example, as illustrated in FIG. 9(*a*), when a beam 423 projects downward from a ceiling 422 and there is an area where a height h1 from a ground to the beam 423 is lower than a vehicle height h2 of the host vehicle 100, the host vehicle 100 cannot pass under the beam 423. The two or more beacons 201*a*, 201*c* are installed in such an area to define the area as a non-guidance area 313, thereby preventing the vehicle from being guided and passing. The ID information transmitted from the beacon 201*c* includes information on the height h1 from a road surface 421 to the beam 423. The non-guidance area 313 constitutes a virtual cube having a rectangular surface along the road surface 421 and four rectangular surfaces vertically rising from each side.

The position information acquisition unit 122 of the vehicle control device 101 acquires the position information of the beacons 201*a*, 201*c*. Then, the high-accuracy map information is generated on the basis of the ID information including the height information of the beacon 201*c*. The guidance area estimation unit 124 uses the ID information on area heights of the beacon 201*a* and the beacon 201*c* to set the three-dimensional non-guidance area 313 that the vehicle cannot enter. The course estimation unit 125 estimates a route L on which the vehicle travels while avoiding the non-guidance area 313. As described above, in the modification, area designation is performed for a place where there is a problem of passage depending on a vehicle type, such as the beam 423, and the three-dimensional area is enable to be designated by adding the height information to the transmission information from the beacon 201.

Figure 10:
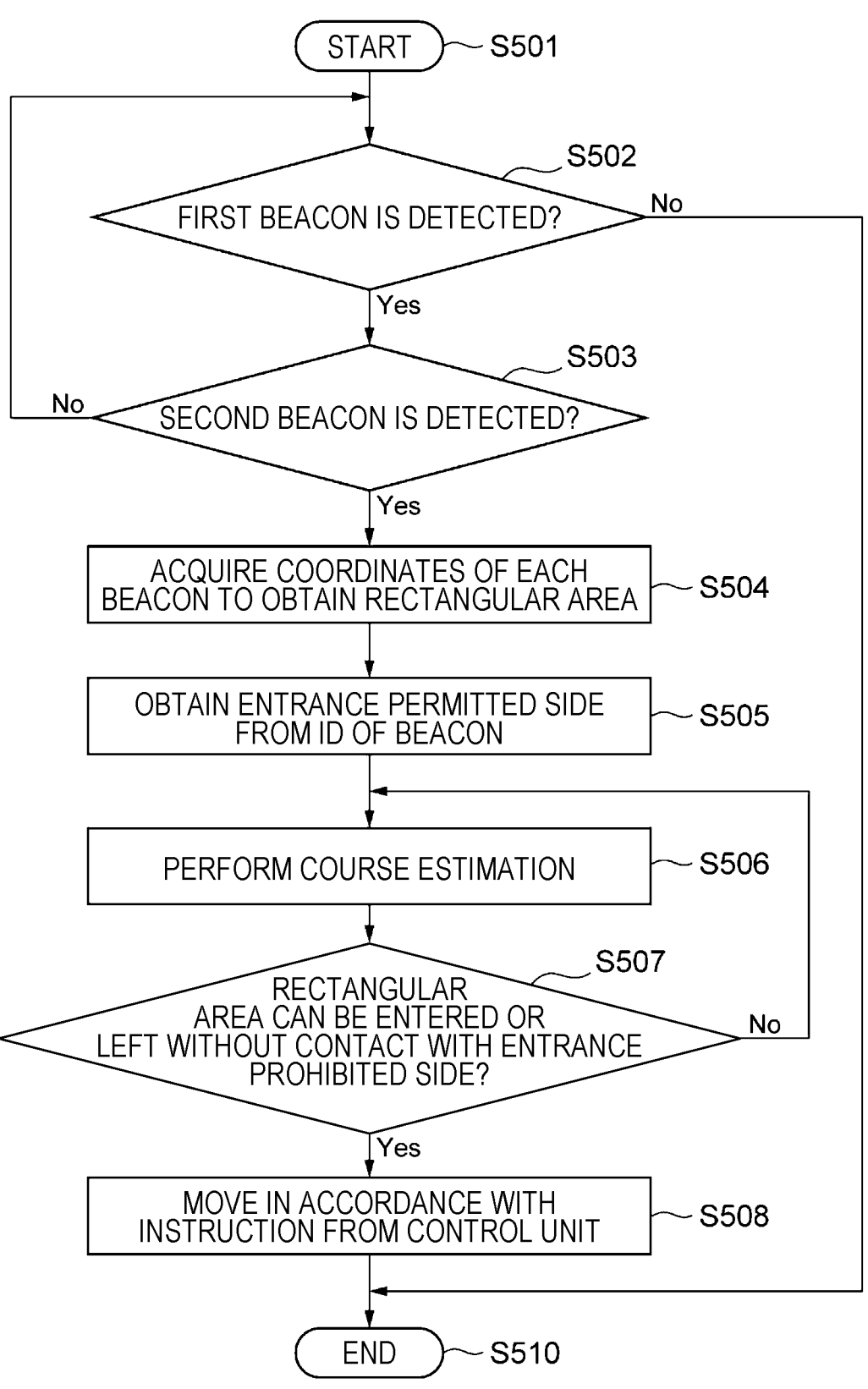
FIG. 10 is a flowchart for describing a vehicle control method.

FIG. 10 is a flowchart for describing a vehicle control method.

This flowchart illustrates an example of control during traveling in the vicinity of the rectangular area during low-speed automatic traveling.

During the low-speed automatic traveling, the host vehicle 100 monitors the radio wave from the beacon 201 by the radio receiver 121 while periodically switching the antennas 102. The start in S501 is executed in a preset program cycle, so that a periodic monitoring operation is performed. In S502, the presence or absence of the signal from the first beacon 201*a* is checked, and if there is no reception, the processing proceeds to S510 and ends.

When the signal from the first beacon 201*a* is received, the processing proceeds to S503, and the presence or absence of the signal from the second beacon 201*b* is checked. Then, in a case where the signal from the second beacon 201*b* is present, the coordinates of each of the beacons 201*a*, 201*b* are acquired on the basis of the ID information of each of the beacons in S504, and the rectangular area 302 and the guidance area 312 are obtained. When the signal from the second beacon 201*b* is absent, the processing returns to S502.

In S505, the information on the entry permitted sides A and the entry prohibited sides B of the guidance area 312 is acquired from the ID information of each of the beacons 201*a*, 201*b*. A course of automatic traveling of the host vehicle 100 is estimated in S506, and it is checked in S507 whether the course allows the host vehicle 100 to enter or exit from the guidance area 312 without contacting the entry prohibited sides B.

If the host vehicle 100 will come into contact with the entry prohibited sides B, the processing returns to S506, and the course estimation is executed again. When it is determined that there is no contact with the entry prohibited sides B with respect to the estimated course, the automatic traveling is continued in accordance with an instruction from the control unit 126 in S508. The processing ends in S510. Note that since the reception check of the signals from the beacons is periodically performed, the coordinates of the guidance area 312 from the host vehicle 100 are updated and corrected even during the automatic traveling.

The position information of the beacons 201 is adjusted by inputs of the various sensors 103 and the target fusion unit 123, and the rectangular area 302 indicated by the beacons 201 is obtained by the guidance area estimation unit 124. Then, in accordance to the constraint (entry permitted side A, entry prohibited side B) of the guidance area 312 obtained from the rectangular area 302, a route for entering the guidance area 312 is obtained by the course estimation unit 125, and a control signal is sent from the control unit 126 to the actuator 127, so that the host vehicle 100 is steered along the route.

Figure 11:
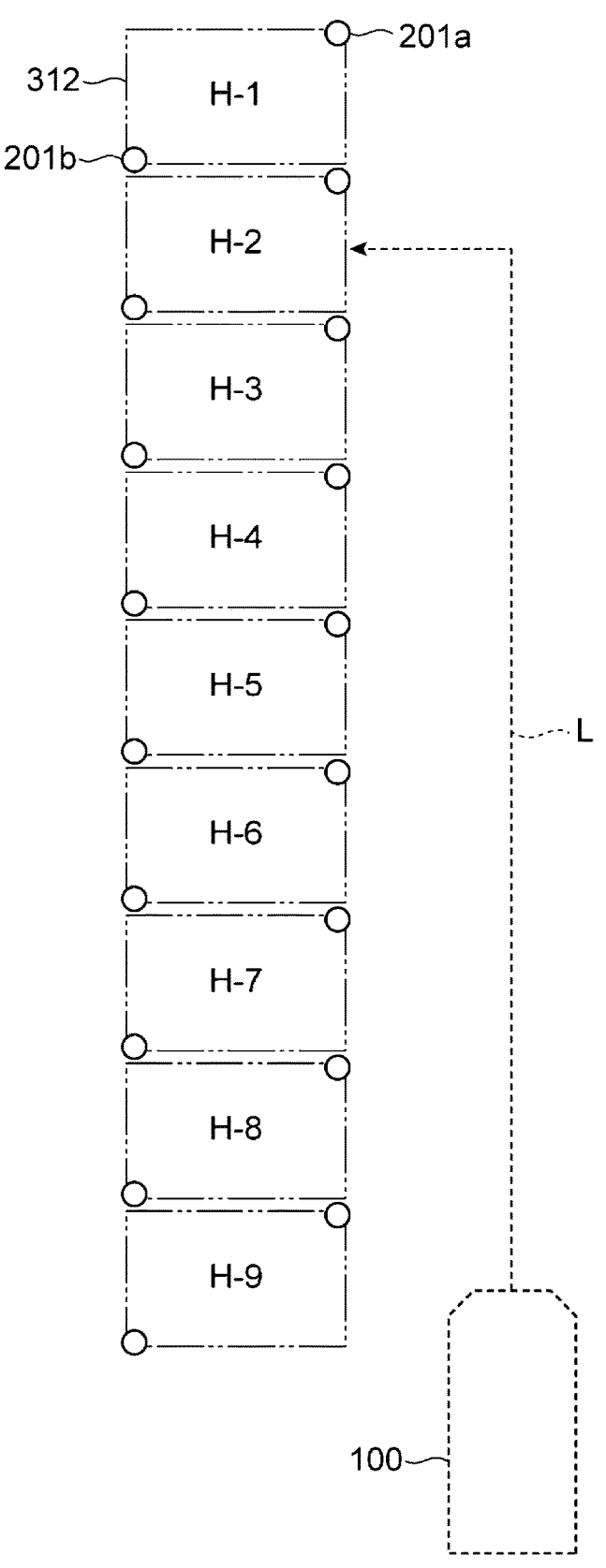
FIG. 11 is a diagram illustrating another example of the present embodiment.

FIG. 11 is a diagram illustrating another example in the present embodiment. FIG. 11 illustrates an example in which a plurality of stop frames H-1 to H-9 are disposed side by side and the host vehicle 100 travels along the route L.

In the above example, the passage and stop in the narrow guidance area have been described. However, in the example illustrated in FIG. 11, the wireless beacons 201*a*, 201*b* are installed for each of the stop frames H-1 to H-9, an identification number is assigned to each of the stop frames so that each of the stop frames can be identified, and information of the identification number is given to the ID information of the beacons 201*a*, 201*b*.

The guidance area estimation unit 124 identifies the individual stop frames on the basis of the unique identification numbers assigned to the respective stop frames H-1 to H-9 and included in the radio waves of the beacons 201*a*, 201*b*. The course estimation unit 125 can create a course for the designated stop frame so as to stop the host vehicle 100. Therefore, it is possible to designate each of the stop frames by the beacons 201*a*, 201*b*, and it is possible to guide the vehicle to a stop position of which details are unknown.

Figure 12:
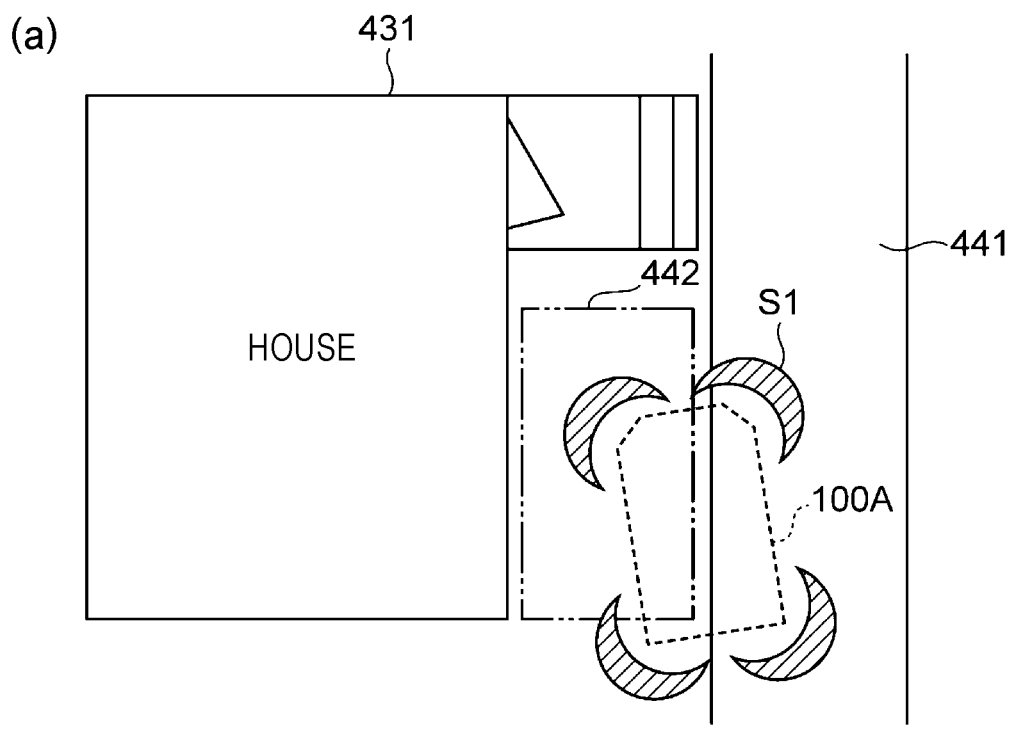
FIG. 12 is diagrams for describing a conventional technique.
Figure 12:
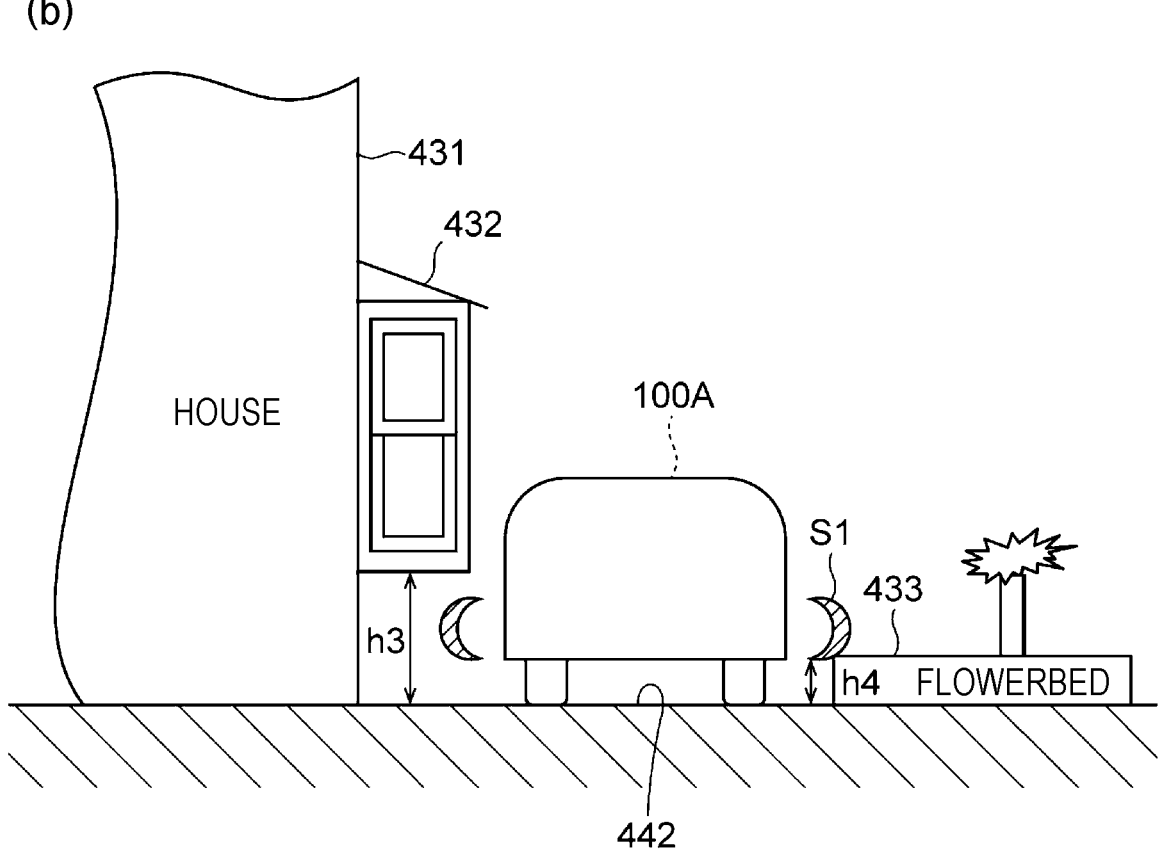

FIG. 12 is diagrams for describing a conventional technique, and is image diagrams for describing a method for stopping the host vehicle at a designated position using ultrasonic sensors.

The ultrasonic sensors are installed at four corners of a vehicle 100A. Each of the ultrasonic sensors has a narrow detection range S1, and in order to create a high-accuracy map for guiding the vehicle 100A to a guidance area 442, it is necessary to cause the vehicle 100A to approach and leave an obstacle a plurality of times to acquire position information of the obstacle. The ultrasonic sensor has a shape that is difficult to recognize such as a fence, and as illustrated in FIG. 12(*b*), heights h3, h4 do not coincide with a height of the detection range S1 of the ultrasonic sensor as in a bay window 432 and a flowerbed 433 of a house 431, so that an obstacle may not be detected.

The vehicle control device 101 of the present example receives directions of the radio waves transmitted from the beacons 201 by the plurality of antennas 102, obtains the relative positions by trigonometry, and disposes the two beacons 201 of different types on the diagonal line 301 of the rectangular area 302 to define the rectangle. Then, the guidance area 312 is defined by expanding the rectangular area outward by a designated value, and the entry permitted sides A of the guidance area 312 are designated on the basis of the ID information of the beacons 201. As a result, the guidance area of the vehicle can be quickly and accurately recognized, and the vehicle can be caused to enter a narrow area due to gate pillars or an obstacle, and stop or pass by the low-speed automatic traveling control.

Although the embodiments of the present invention have been described in detail above, the present invention is not limited to the above embodiments, and various design changes can be made without departing from the spirit of the present invention described in the claims. For example, the above-described embodiments have been described in detail in order to describe the present invention in an easy-to-understand manner, and are not necessarily limited to those having all the configurations described. Moreover, a part of a configuration of a certain embodiment can be replaced with a configuration of another embodiment, and a configuration of a certain embodiment can also be added to a configuration of another embodiment. Moreover, with respect to a part of a configuration of each embodiment, addition, deletion, or replacement of another configuration can be made.

REFERENCE SIGNS LIST

100 host vehicle
101 vehicle control device
102 antenna (wireless reception antennas)
103 various sensors
121 wireless receiver (wireless reception unit)
122 position information acquisition unit
123 target fusion unit
124 guidance area estimation unit
125 course estimation unit
126 control unit
127 actuator
201 beacon (wireless transmitter)
201*a* first beacon
201*b* second beacon
301 diagonal line
302 rectangular area
312 guidance area

The invention claimed is:

1. A vehicle control device, comprising:
a wireless reception unit that receives radio waves through a plurality of wireless reception antennas mounted on a vehicle, the radio waves being transmitted from a plurality of wireless transmitters;

a position information acquisition unit that obtains position information of the wireless transmitters by using orientation information of the radio waves received by the wireless reception unit; and
a guidance area estimation unit that sets a diagonal line of a rectangular area from the position information and estimates a guidance area from the diagonal line.

2. The vehicle control device according to claim 1, wherein the position information acquisition unit obtains distances from two wireless reception antennas to one of the wireless transmitters by trigonometry using a distance between the two wireless reception antennas and respective directions through the two wireless reception antennas to the one wireless transmitter.

3. The vehicle control device according to claim 1, wherein the guidance area estimation unit sets an entry permitted side through which the vehicle can enter the guidance area from four sides defining the guidance area by using ID information of the radio waves.

4. The vehicle control device according to claim 1, wherein by using ID information on an area height that each of the radio waves of each of the wireless transmitters has, the guidance area estimation unit sets a three-dimensional non-guidance area that the vehicle cannot enter.

5. The vehicle control device according to claim 1, wherein the guidance area estimation unit identifies an individual stop frame on a basis of a unique identification number assigned to each stop frame of the vehicle, the unique identification number being possessed by each of the radio waves of each of the wireless transmitters.

* * * * *